US011018355B2

(12) United States Patent
Shimasaki

(10) Patent No.: US 11,018,355 B2
(45) Date of Patent: May 25, 2021

(54) FUEL CELL SYSTEM AND CONTROL METHOD OF FUEL CELL SYSTEM

(71) Applicant: TOYOTA JIDOSHA KABUSHIKI KAISHA, Toyota (JP)

(72) Inventor: Shinobu Shimasaki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 181 days.

(21) Appl. No.: 16/209,117

(22) Filed: Dec. 4, 2018

(65) Prior Publication Data

US 2019/0181468 A1 Jun. 13, 2019

(30) Foreign Application Priority Data

Dec. 7, 2017 (JP) .............................. JP2017-235251

(51) Int. Cl.
| | |
|---|---|
| *H01M 8/04111* | (2016.01) |
| *H01M 8/04007* | (2016.01) |
| *H01M 8/0662* | (2016.01) |
| *H01M 8/04746* | (2016.01) |
| *H01M 8/04089* | (2016.01) |

(52) U.S. Cl.
CPC .... *H01M 8/04111* (2013.01); *H01M 8/04007* (2013.01); *H01M 8/04089* (2013.01); *H01M 8/04753* (2013.01); *H01M 8/0662* (2013.01); *H01M 2250/20* (2013.01)

(58) Field of Classification Search
CPC ......... H01M 8/04111; H01M 8/04089; H01M 8/0662; H01M 8/04753
See application file for complete search history.

(56) References Cited

U.S. PATENT DOCUMENTS

2017/0179504 A1 6/2017 Honda

FOREIGN PATENT DOCUMENTS

| JP | 2009-004169 | 1/2009 |
|---|---|---|
| JP | 2011-001899 | 1/2011 |
| JP | 2017-117517 | 6/2017 |
| JP | 2017-126540 | 7/2017 |

OTHER PUBLICATIONS

JP 2009123550—translation.*

* cited by examiner

*Primary Examiner* — Ladan Mohaddes
(74) *Attorney, Agent, or Firm* — Finnegan, Henderson, Farabow, Garrett & Dunner, LLP

(57) ABSTRACT

A fuel cell system includes: an air compressor that sends out oxidant gas to a fuel cell stack, including a motor, a housing, and an impeller; an oxidant gas supply and discharge passage; a pressure-regulating valve; and a controller. The controller executes at least one of a first process and a second process, the first process being executed for increasing a speed of the impeller after decreasing an opening degree of the pressure-regulating valve in a first operation where both decreasing the opening degree of the pressure-regulating valve and increasing the speed of the impeller are performed, the second process being executed for increasing the opening degree of the pressure-regulating valve after decreasing the speed in a second operation where both increasing the opening degree of the pressure-regulating valve and decreasing the speed are performed.

8 Claims, 7 Drawing Sheets

FUEL CELL SYSTEM AND CONTROL METHOD OF FUEL CELL SYSTEM

INCORPORATION BY REFERENCE

The disclosure of Japanese Patent Application No. 2017-235251 filed on Dec. 7, 2017 including the specification, drawings and abstract is incorporated herein by reference in its entirety.

BACKGROUND

1. Technical Field

The present disclosure relates to a fuel cell system and a control method of the fuel cell system.

2. Description of Related Art

There is known a fuel cell system that includes a fuel cell, an air compressor that supplies oxidant gas to the fuel cell, and a supply passage that passes the oxidant gas supplied to the fuel cell (for example, Japanese Patent Application Publication No. 2017-126540). The air compressor includes an impeller disposed in the supply passage of the oxidant gas, a motor configured to rotate the impeller, a housing that divides an area where the motor is disposed from the supply passage, and a shaft that extends through the housing to couple a rotary shaft of the motor with a rotary shaft of the impeller. In the housing, oil may be used. In the related art, at least one of a speed of the impeller or an opening degree of a pressure-regulating valve (bypass pressure-regulating valve) disposed in the bypass passage is controlled when the fuel cell is started up. This suppresses the oil in the housing flowing into the fuel cell.

SUMMARY

In the above-described related art, more oxidant gas is discharged from the supply passage when the bypass pressure-regulating valve is opened more. Hence, the pressure inside the housing may become higher than an impeller back face pressure. When the pressure inside the housing becomes higher than the impeller back face pressure, the oil in the housing may leak to the supply passage and flow into the fuel cell. Accordingly, there is a demand for a technology that can reduce the possibility of the oil in the housing leaking to the supply passage.

(1) A first aspect of the present disclosure relates to a fuel cell system including: a fuel cell stack; a fuel gas supply mechanism that supplies fuel gas to the fuel cell stack; an oxidant gas supply and discharge mechanism including an air compressor that supplies oxidant gas to the fuel cell stack; and a controller that controls supply of the fuel gas and the oxidant gas to control generation of electric power by the fuel cell stack. The oxidant gas supply and discharge mechanism has: an oxidant gas supply and discharge passage that passes the oxidant gas; and a pressure-regulating valve disposed on a downstream side of the air compressor in the oxidant gas supply and discharge passage. The air compressor has: an impeller disposed in the oxidant gas supply and discharge passage to deliver the oxidant gas; a motor configured to rotate the impeller; a housing that houses the motor and divides an area where the motor is disposed from the oxidant gas supply and discharge passage where the impeller is disposed; and a shaft that extends through the housing to couple a rotary shaft of the motor with a rotary shaft of the impeller. The controller executes at least one of a first process and a second process, the first process being executed for increasing a speed of the impeller after decreasing an opening degree of the pressure-regulating valve in a first operation where both decreasing the opening degree of the pressure-regulating valve and increasing the speed of the impeller are performed, the second process being executed for increasing the opening degree of the pressure-regulating valve after decreasing the speed in a second operation where both increasing the opening degree of the pressure-regulating valve and decreasing the speed are performed. According to the fuel cell system, the controller executes at least one of the first process for increasing the speed after decreasing the opening degree of the pressure-regulating valve in the first operation, and the second process for increasing the opening degree of the pressure-regulating valve after decreasing the speed in the second operation. Accordingly, at least in one of the cases where the first operation is performed and where the second operation is performed, it is possible to suppress the situation where the impeller back face pressure, that is the pressure inside a space between the impeller and the housing in the oxidant gas supply and discharge passage, becomes negative. Hence, a leakage of the oil in the housing to the outside (the oxidant gas supply and discharge passage) can be suppressed.

(2) In the fuel cell system of the above aspect, the controller may execute the first process without determining whether or not an impeller back face pressure, that is a pressure inside a space between the impeller and the housing in the oxidant gas supply and discharge passage, becomes negative in the first operation, and execute the second process without determining whether or not the impeller back pressure becomes negative in the second operation. The fuel cell system makes it possible to determine whether or not to execute the first process and the second process without determining whether or not the impeller back pressure becomes negative. Hence, the fuel cell system can reduce the possibility of complicated control performed by the controller.

(3) In the fuel cell system of the above aspect, the controller may determine whether or not an impeller back pressure, that is a pressure inside a space between the impeller and the housing in the oxidant gas supply and discharge passage, becomes negative, with use of data obtained in advance, the data indicating an operating point that represents a combination of the opening degree of the pressure-regulating valve and the speed of the impeller that makes the impeller back pressure negative, execute the first process, when the impeller back pressure becomes negative at least in a case where increasing the speed is executed first in the first operation, and execute the second process, when the impeller back pressure becomes negative at least in a case where increasing the opening degree is executed first in the second operation. The fuel cell system can enhance the degree of freedom of control on the pressure-regulating valve and the air compressor when there is no possibility of occurrence of negative pressure.

(4) A second aspect of the present disclosure relates to a control method of a fuel cell system. The fuel cell system includes a fuel cell stack, a fuel gas supply mechanism that supplies fuel gas to the fuel cell stack, an oxidant gas supply and discharge mechanism including an air compressor that supplies oxidant gas to the fuel cell stack, and a controller that controls supply of the fuel gas and the oxidant gas to control electric power generation by the fuel cell stack. The oxidant gas supply and discharge mechanism has an oxidant gas supply and discharge passage that passes the oxidant gas, and a pressure-regulating valve disposed on a downstream side of the air compressor in the oxidant gas supply and discharge passage. The air compressor has an impeller disposed in the oxidant gas supply and discharge passage to deliver the oxidant gas, a motor configured to rotate the impeller, a housing that houses the motor and divides an area where the motor is disposed from the oxidant gas supply and discharge passage where the impeller is disposed, and a shaft that extends through the housing to couple a rotary shaft of the motor with a rotary shaft of the impeller. The control method comprises executing at least one of a first process and a second process by controller, the first process being executed for increasing a speed of the impeller after decreasing an opening degree of the pressure-regulating valve in a first operation where both decreasing the opening degree of the pressure-regulating valve and increasing the speed of the impeller are performed, the second process being executed for increasing the opening degree of the pressure-regulating valve after decreasing the speed in a second operation where both increasing the opening degree of the pressure-regulating valve and decreasing the speed are performed. According to the control method of a fuel cell system of this aspect, the controller executes at least one of the first process for increasing the speed after decreasing the opening degree of the pressure-regulating valve in the first operation and the second process for increasing the opening degree of the pressure-regulating valve after decreasing the speed in the second operation. Accordingly, at least in one of the cases where the first operation is performed and where the second operation is performed, it is possible to suppress the situation where the impeller back pressure becomes negative. Hence, a leakage of the oil in the housing to the outside (oxidant gas supply and discharge passage) can be suppressed.

The present disclosure can be implemented in various aspects other than the fuel cell system and the control method of a fuel cell system described above. For example, the present disclosure can be implemented in the aspects, such as a program for controlling a fuel cell system and a fuel cell vehicle including a fuel cell system.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. First Embodiment

Figure 1:
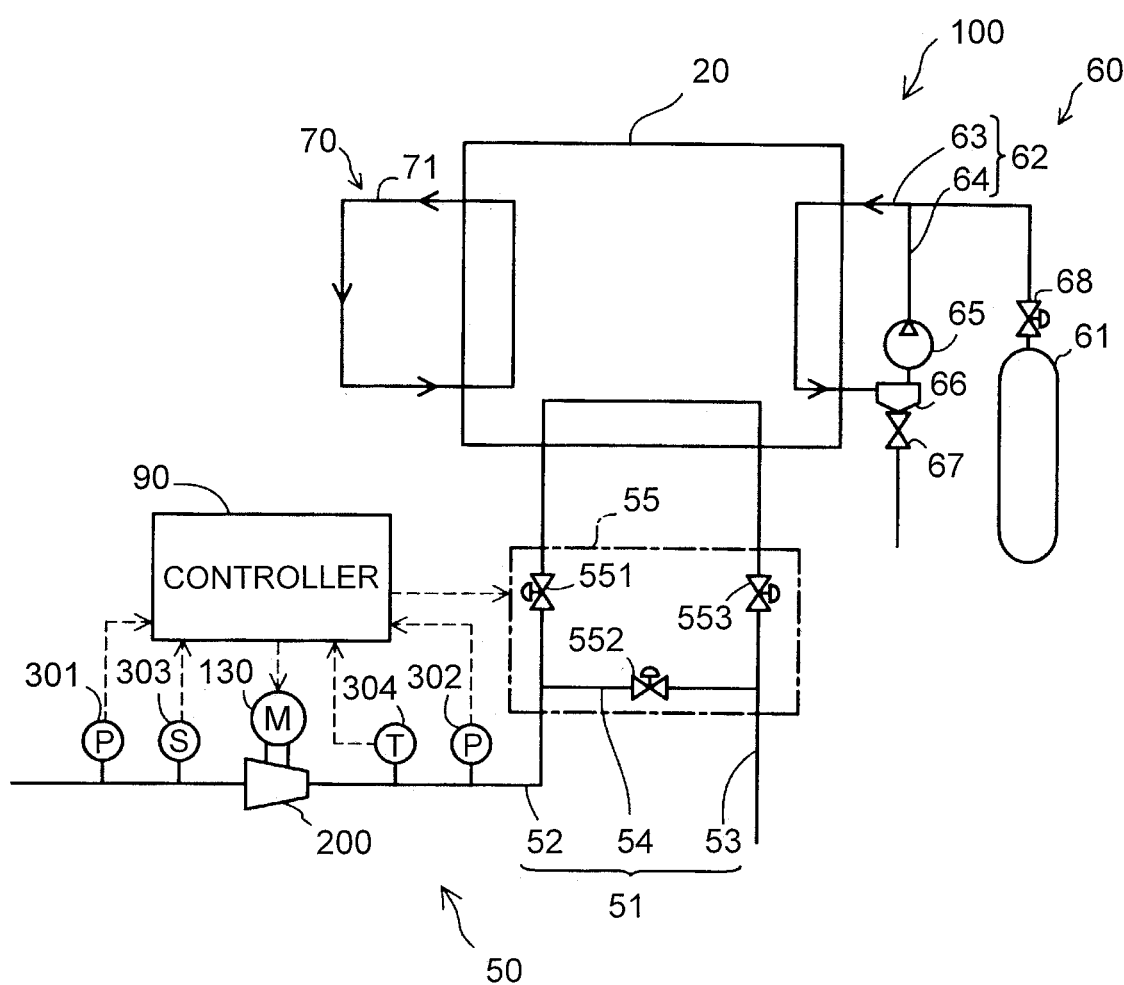
FIG. 1 is a schematic view of a fuel cell system according to a first embodiment.

FIG. 1 is a schematic view of a fuel cell system 100 according to a first embodiment. In the present embodiment, the fuel cell system 100 generates electric power by a reaction of fuel gas (anode gas) and oxidant gas (cathode gas). For example, the fuel cell system 100 is mounted on a fuel cell vehicle, and is used as a power generator for driving a driving motor. The fuel cell system 100 includes a fuel cell stack 20, an oxidant gas supply and discharge mechanism 50, a fuel gas supply mechanism 60, a coolant circulation mechanism 70, and a controller 90. The coolant circulation mechanism 70, which is connected to the fuel cell stack 20, has a coolant circulation passage 71 that passes coolant (for example, water), and a pump (not shown) that pumps the coolant.

The fuel cell stack 20 has a stack structure formed by stacking a plurality of fuel cell unit cells (not shown). In the present embodiment, each of the fuel cell unit cells that constitute the fuel cell stack 20 is a polymer electrolyte fuel cell that generates electric power by an electrochemical reaction of oxygen and hydrogen. The coolant circulation mechanism 70 regulates the fuel cell stack 20 to an appropriate temperature.

The fuel gas supply mechanism 60 has a function to supply hydrogen as a fuel gas to the fuel cell stack 20. The fuel gas supply mechanism 60 includes a hydrogen tank 61, a fuel gas passage 62, a hydrogen pump 65, and a gas-liquid separator 66. The hydrogen tank 61, which is a high pressure tank for storing fuel gas, discharges fuel gas by opening a pressure-regulating valve 68. The fuel gas passage 62, which is a passage for passing the fuel gas, has a fuel gas supply passage 63 and a fuel gas circulation passage 64. The fuel gas supply passage 63 is a passage for supplying fuel gas to the fuel cell stack 20, and is a passage that connects the hydrogen tank 61 and the fuel cell stack 20. The fuel gas circulation passage 64 is connected to the middle of the fuel gas supply passage 63. The fuel gas circulation passage 64 is a passage for collecting unreacted fuel gas that has passed through the fuel cell stack 20, and re-supplying the collected fuel gas to the fuel cell stack 20. Disposed in the middle of the fuel gas circulation passage 64 are the hydrogen pump 65 for pumping out fuel gas and the gas-liquid separator 66 for separating fuel gas and liquid water contained in the fuel gas. The liquid water contained in the fuel gas is generated-water generated by an electrochemical reaction in the fuel cell stack 20. The liquid water separated by the gas-liquid separator 66 is discharged to the outside by opening an open-close valve 67.

The oxidant gas supply and discharge mechanism 50 has a function to supply air, that is oxidant gas, to the fuel cell stack 20 and to discharge the oxidant gas discharged from the fuel cell stack 20 to the outside. The oxidant gas supply and discharge mechanism 50 includes an oxidant gas supply and discharge passage 51 that is a passage for passing oxidant gas, a pressure-regulating valve unit 55, an air compressor 200, and a plurality of sensors 301 to 304 disposed in the middle of the oxidant gas supply and discharge passage 51. The oxidant gas supply and discharge passage 51 has an oxidant gas supply passage 52, an oxidant gas discharge passage 53, and a bypass passage 54. The oxidant gas supply passage 52 and the oxidant gas discharge passage 53 are each a pipeline connected to the fuel cell stack 20. The air compressor 200 is disposed in the middle of the oxidant gas supply passage 52 to deliver oxidant gas to the fuel cell stack 20. The oxidant gas discharge passage 53 discharges the oxidant gas delivered from the air compressor 200 to the outside. The bypass passage 54 is a passage that communicates the oxidant gas supply passage 52 and the oxidant gas discharge passage 53 without through the fuel cell stack 20. The pressure-regulating valve unit 55 may be regarded as "pressure-regulating valve" disclosed in SUMMARY.

The air compressor 200 changes the speed (rotational speed) of an impeller (hereinafter, also simply stated as the speed (rotational speed) of the air compressor 200) by the motor 130. In the present embodiment, the air compressor 200 is a centrifugal-type air compressor that compresses air with the centrifugal force generated by rotation of the impeller. The amount of oxidant gas delivered from the air compressor 200 and an outlet-side pressure of the air compressor 200 are determined by the speed of the air compressor 200 and a passage resistance on the downstream side of the air compressor 200. The air compressor 200 will be described in detail later.

The pressure-regulating valve unit 55 has a plurality of pressure-regulating valves 551 to 553. The pressure-regulating valve unit 55 regulates the passage resistance on the downstream side of the air compressor 200 (specifically, a portion between the air compressor 200 and the pressure-regulating valve unit 55) in the oxidant gas supply and discharge passage 51 by regulating an opening degree of the respective pressure-regulating valves 551 to 553 in stages. The outlet-side pressure that is the pressure applied to the oxidant gas delivered from the air compressor 200 changes in response to a change in the passage resistance on the downstream side of the air compressor 200. For example, in the case where the opening degree of the pressure-regulating valve unit 55 is regulated when the speed of the air compressor 200 is constant, so that the passage resistance decreases, the outlet-side pressure decreases. For example, in the case where the opening degree of the pressure-regulating valve unit 55 is regulated when the speed of the air compressor 200 is constant, so that the passage resistance increases, the outlet-side pressure increases. That is, in the present embodiment, the increase and decrease in the passage resistance correspond to the increase and decrease in the outlet-side pressure when the air compressor 200 has a constant speed. Hereinafter, a combination of the opening degrees of the pressure-regulating valves 551 to 553 included in the pressure-regulating valve unit 55 is stated as an opening degree of the pressure-regulating valve unit 55. When the outlet-side pressure is changed in response to a change in the opening degree of the pressure-regulating valve unit 55, a flow rate of oxidant gas sucked into the air compressor 200 and a flow rate (delivery flow rate) of oxidant gas delivered from the air compressor 200 change. Specifically, when the outlet-side pressure increases in response to the opening degree of the pressure-regulating valve unit 55, the delivery flow rate of oxidant gas reduces. When the outlet-side pressure decreases in response to the opening degree of the pressure-regulating valve unit 55, the delivery flow rate of oxidant gas increases.

In the present embodiment, the pressure-regulating valves 551 to 553 included in the pressure-regulating valve unit 55 are three valve systems different in function from each other: a first pressure-regulating valve 551; a second pressure-regulating valve 552; and a third pressure-regulating valve 553. The first pressure-regulating valve 551 is disposed in the oxidant gas supply passage 52 to regulate the passage resistance of the oxidant gas supply passage 52. The third pressure-regulating valve 553 is disposed in the oxidant gas discharge passage 53 to regulate the passage resistance of the oxidant gas discharge passage 53. The first pressure-regulating valve 551 and the third pressure-regulating valve 553 regulate the amount of oxidant gas supplied to the fuel cell stack 20 by regulation of the passage resistance. The second pressure-regulating valve 552 is disposed in the bypass passage 54 to regulate the amount of oxidant gas flowing into the bypass passage 54 by regulating the passage resistance of the bypass passage 54. The first to third pressure-regulating valves 551 to 553 regulate the delivery flow rate and the outlet-side pressure of the air compressor 200 by regulating the passage resistance. The pressure-regulating valves 551, 552, 553 that constitute the pressure-regulating valve unit 55 are each a solenoid valve or a motor valve, for example. Specifically, a butterfly valve and a globe valve can be used as the pressure-regulating valves 551 to 553. Although the pressure-regulating valve unit 55 has three pressure-regulating valves 551 to 553 in the present embodiment, the present disclosure is not limited to this. The pressure-regulating valve unit 55 may have four or more pressure-regulating valves, or two or less pressure-regulating valves.

The sensors 301 to 304 include a first pressure sensor 301, a second pressure sensor 302, an air flowmeter 303, and a temperature sensor 304. The first pressure sensor 301 is disposed on the upstream side of the air compressor 200 in the oxidant gas supply passage 52. The second pressure sensor 302 and the temperature sensor 304 are disposed in a location on the downstream side of the air compressor 200 and the upstream side of the pressure-regulating valve unit 55 in the oxidant gas supply passage 52. The first pressure sensor 301 measures the pressure of air sucked by the air compressor 200, that is, an atmospheric pressure in the present embodiment. The second pressure sensor 302 measures the outlet-side pressure of the air compressor 200. The temperature sensor 304 measures the temperature of oxidant gas delivered from the air compressor 200. The air flowmeter 303 measures the flow rate of oxidant gas sucked into the air compressor 200.

The controller 90, which includes a CPU and a memory, controls supply of fuel gas and oxidant gas to control generation of electric power by the fuel cell stack 20. For example, the controller 90 controls the air compressor 200 and the pressure-regulating valve unit 55 in response to a required electric power generation amount of the fuel cell stack 20. The controller 90 also receives measurement results of the sensors 301 to 304.

Figure 2:
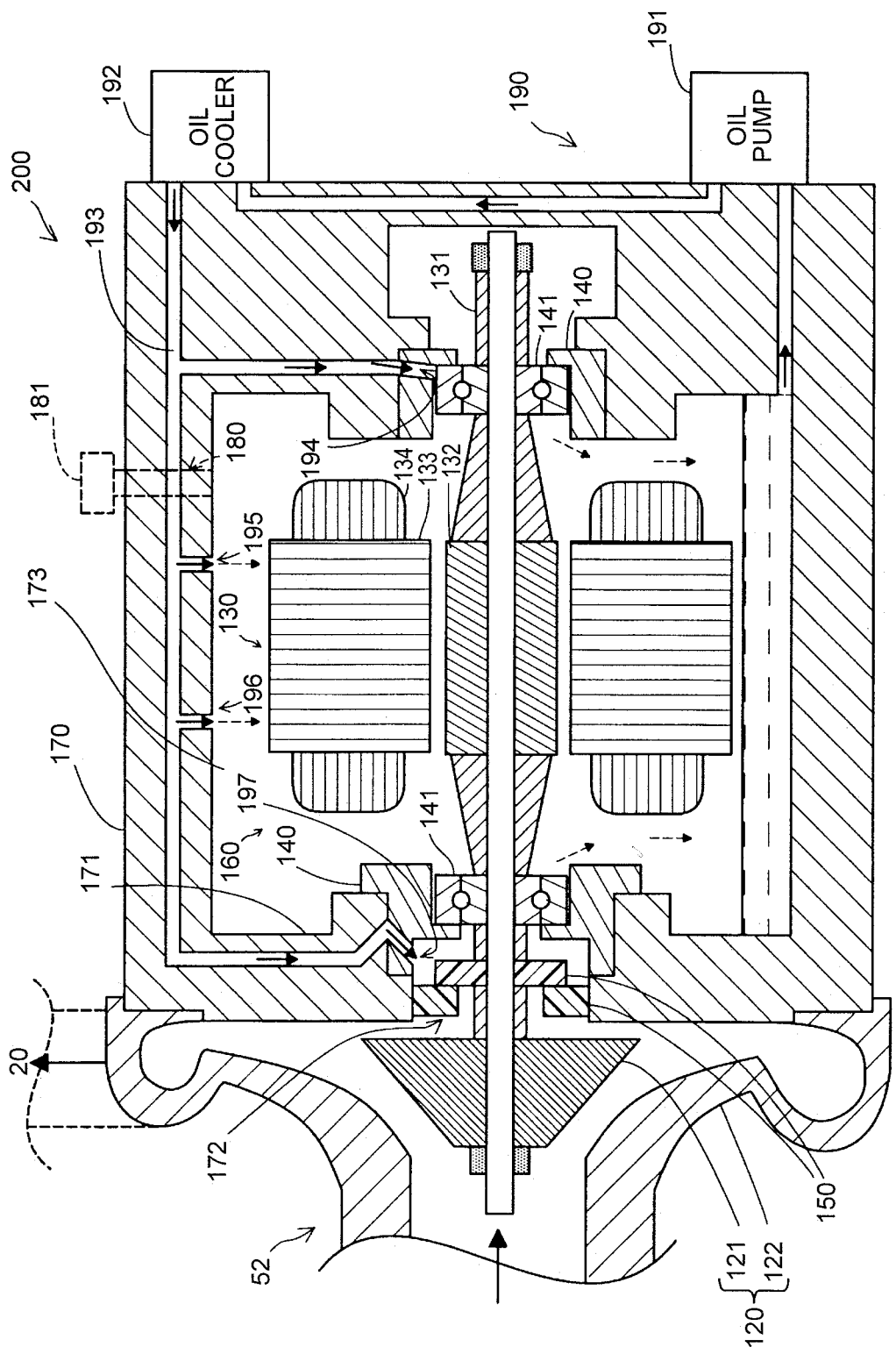
FIG. 2 is a schematic view of an air compressor included in the fuel cell system according to the first embodiment.

FIG. 2 is a schematic view of the air compressor 200 included in the fuel cell system 100 according to the first embodiment. The air compressor 200 includes an impeller unit 120, a motor unit 160, a housing 170 that is a casing for housing the motor unit 160, and an oil circulation mechanism 190. The oil circulation mechanism 190 supplies oil to the motor unit 160 for cooling and lubricating the motor unit 160, and collects the supplied oil. Some of the oil is housed in the housing 170 together with the motor unit 160.

The impeller unit 120 has an impeller 121 that delivers oxidant gas, and an impeller housing portion 122 that houses the impeller 121. The impeller housing portion 122 forms some of the oxidant gas supply passage 52. When the impeller 121 rotates, the oxidant gas sucked into the impeller housing portion 122 from the upstream side of the oxidant gas supply passage 52 is compressed inside the impeller housing portion 122, and is delivered to the downstream side of the oxidant gas supply passage 52.

The motor unit 160 has a motor 130, a pair of bearings 141, and a pair of bearing holders 140. The motor 130 has a shaft 131, a rotor 132 having a magnet on the surface, and a stator 134. The motor 130 rotates the impeller 121. The motor unit 160 is housed in a motor housing portion 173 inside the housing 170 with one end portion of the shaft 131 projecting to the outside. The shaft 131 extends through the housing 170 to couple a rotary shaft of the motor 130 with a rotary shaft of the impeller 121. The rotor 132 is formed integrally with the shaft 131. The stator 134 has a coil 133 and is disposed around the rotor 132 that surrounds the shaft 131. The stator 134 rotates the rotor 132 by receiving supply of electric power. When the rotor 132 rotates, the shaft 131 and the impeller 121 connected to the shaft 131 rotate. The bearings 141 are disposed such that the rotor 132 is interposed between the bearings 141 in an axial direction to rotatably support the shaft 131. The bearing holders 140 are disposed so as to cover the periphery of the bearings 141 to support the bearings 141. In the present embodiment, the bearings 141 are ball bearings.

An end portion of the shaft 131 on the side connected to the impeller 121 projects to the outside of the housing 170 (impeller housing portion 122) through a through-hole 172 formed in one wall portion 171 of the housing 170. A mechanical seal 150 is disposed around the through-hole 172 on the inner side of the housing 170. The mechanical seal 150 is disposed to seal the through-hole 172 such that passage of the liquid between the impeller unit 120 and the motor unit 160 is suppressed. In the present embodiment, the mechanical seal 150 has a rotation ring that is connected to the shaft 131 so as to rotate with rotation of the shaft 131, and a fixed ring fixed to the one wall portion 171 of the housing 170.

The housing 170 divides the motor housing portion 173 that is an area where the motor 130 is disposed, from the impeller housing portion 122 that is an area where the impeller 121 is disposed. The housing 170 has a ventilating portion 180 for allowing gas to pass between the outside of the housing 170 and the motor housing portion 173. The ventilating portion 180 has a ventilation valve 181 that is a valve system for switching from the state of communication to the state of non-communication or from the state of non-communication to the state of communication between the outside of the housing 170 and the motor housing portion 173. The ventilation valve 181 is an open-close valve that is automatically opened upon reception of pressure from the motor housing portion 173 when the pressure inside the motor housing portion 173 becomes the atmospheric pressure or more. Thus, the ventilating portion 180 suppresses that the pressure inside the motor housing portion 173 becomes higher than the atmospheric pressure. Examples of the case where the ventilation valve 181 is opened include a case where the temperature in the motor housing portion 173 increases due to the heat generated upon reception of electric power that is supplied for rotation of the motor 130, and thereby the pressure increases. Although the housing 170 includes the ventilating portion 180 having the ventilation valve 181 in the present embodiment, the present disclosure is not limited to this configuration. For example, the ventilating portion 180 may not have the ventilation valve 181. When the housing 170 is not a sealed casing, the ventilating portion 180 is not necessarily needed. Even in such cases, gas can be passed between the inside and the outside (atmosphere) of the motor housing portion 173. Hence, even when the pressure inside the motor housing portion 173 temporarily increases, the pressure inside the motor housing portion 173 decreases to the atmospheric pressure.

The oil circulation mechanism 190 has an oil pump 191, an oil cooler 192, and an oil passage 193. The oil passage 193, which is a passage for passing oil, is formed so as to extend through the inside of the wall of the housing 170 and through the housing 170. The oil passage 193 has supply holes 194 to 197 that are openings for supplying oil to each element of the motor unit 160. In the state where the air compressor 200 is normally used (hereinafter, also simply stated as "used state"), the supply holes 194 to 197 are formed above the shaft 131. Specifically, the supply holes 194 and 197, which are above the bearing 141, supply oil to the bearing 141. The supply holes 195 and 196, which are formed above the stator 134, supply oil to the stator 134. The oil pump 191 for delivering oil, and the oil cooler 192 for cooling the oil are disposed in the middle of the oil passage 193. In the present embodiment, the oil pump 191 and the oil cooler 192 are attached from the outside of the housing 170. The oil is delivered from the oil pump 191 to the oil cooler 192. The oil cooled by the oil cooler 192 moves to the supply holes 194 to 197. The oil is dropped to each element of the motor unit 160 through the supply holes 194 to 197, and moves to a bottom face side of the motor housing portion 173 due to gravity. The oil that has moved to the bottom face side of the motor housing portion 173 temporarily stays in the motor housing portion 173, and then is sucked in and delivered from the oil pump 191. Lubrication with oil can reduce generation of heat and friction, at the time of increasing the speed of the motor 130, more than other lubricating methods (for example, grease lubrication). The oil used in lubrication is also used as a cooling oil for cooling the motor unit 160 that is heated by rotation of the motor 130. For this reason, a temperature increase in the motor unit 160 is suppressed. Since the temperature increase in the motor unit 160, the rotor 132 in particular, is suppressed, a decrease in magnetic force of the rotor 132 is suppressed, which makes it possible to suppress degradation in the performance of the air compressor 200. Although oil is used for both lubrication and cooling in the present embodiment, the present disclosure is not limited to this. For example, oil may be used for one of the lubrication and cooling of the motor unit.

In the air compressor 200, the through-hole 172 is provided in the one wall portion 171 that separates the impeller unit 120 and the motor unit 160 as described above. Although the mechanical seal 150 is disposed, transfer of liquid and gas between the impeller unit 120 and the motor unit 160 may occur since the shaft 131 is inserted in the through-hole 172.

The pressure on the back face of the impeller and the pressure inside the motor housing portion 173 in the air compressor 200 will be described. Here, the back face of the impeller refers to a space between the impeller 121 and the housing 170 (one wall portion 171) in the oxidant gas supply passage 52. An impeller back face pressure that is the pressure on the back face of the impeller decreases, when the impeller 121 rotates to send out air. This is caused by an increase in a flow rate of oxidant gas that is delivered from the air compressor 200. The decrease in the impeller back face pressure in this case is caused by the Venturi effect (ejector effect) in which a local reduction in pressure is caused by an increase in flow velocity in a passage (for example, the impeller housing portion 122) having a small cross section. Here, the pressure inside the motor housing portion 173 is regulated to the same level as the atmospheric pressure by the ventilating portion 180. Therefore, in the present embodiment, when the impeller back face pressure becomes negative, the impeller back face pressure becomes lower than the pressure inside the motor housing portion 173.

Figure 3:
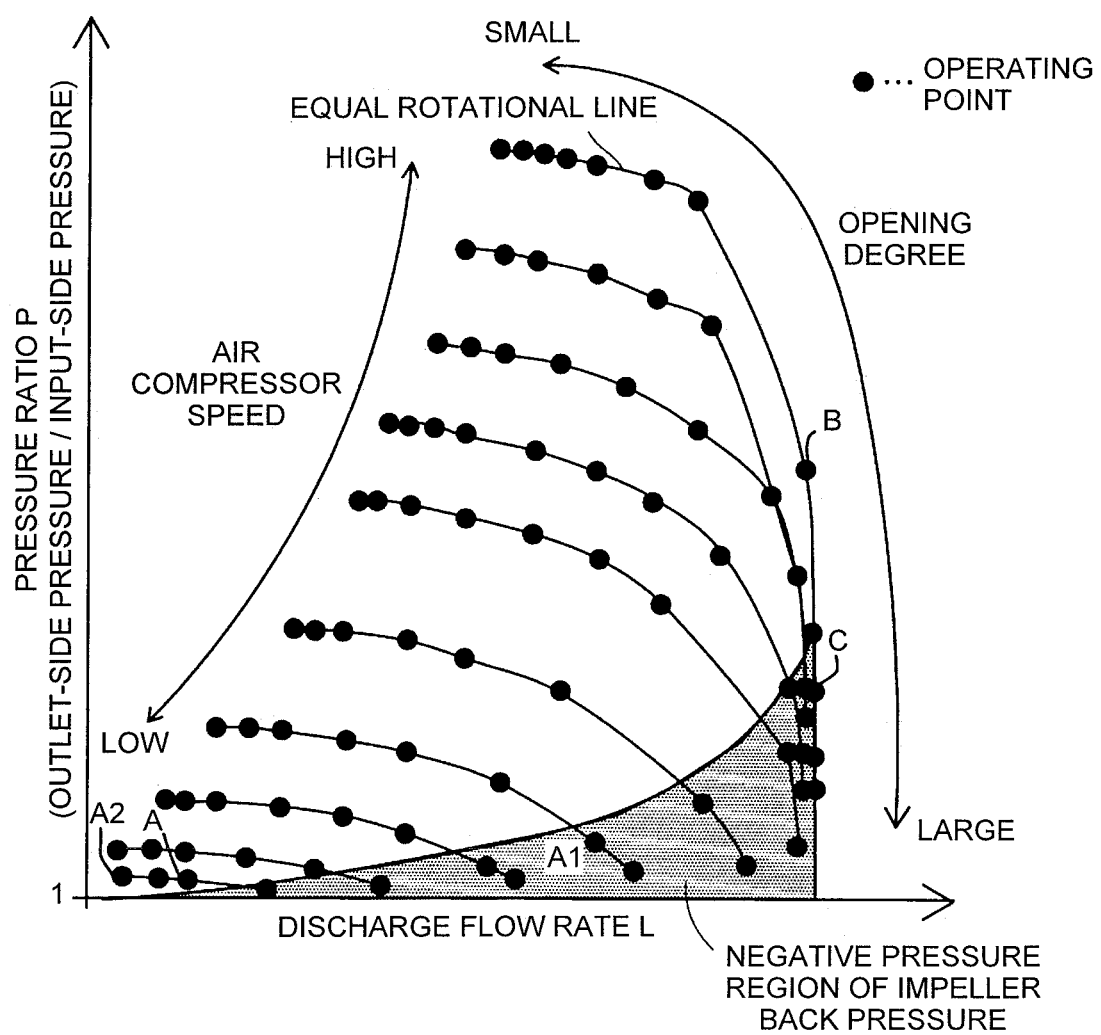
FIG. 3 is a compressor map showing performance characteristics of the air compressor.

FIG. 3 is a compressor map showing performance characteristics of the air compressor 200. The performance characteristics of the air compressor 200 can be obtained by a performance test of the air compressor 200. The compressor map is a two-dimensional map defined by a delivery flow rate L (also simply referred to as "flow rate L") of the air compressor 200 and a pressure ratio (outlet-side pressure/input-side pressure) P between an input-side pressure (atmospheric pressure) and an outlet-side pressure of the air compressor 200, as the performance characteristics of the air compressor 200. The delivery flow rate L and the pressure ratio P of the air compressor 200 can be regulated with the speed of the air compressor 200 and the opening degree of the pressure-regulating valve unit 55. That is, each operating point of the compressor map can be expressed with the speed of the air compressor 200 and the opening degree of the pressure-regulating valve unit 55. Equal rotational lines in the compressor map are lines that connect operating points obtained when the speed of the air compressor 200 is identical. In the compressor map, shown by hatching is a negative region representing a combination of the flow rate L and the pressure ratio P that makes the impeller back face pressure negative. In the present embodiment, the negative pressure region is obtained in advance from the result of a measurement of the impeller back face pressure in each operating point. The compressor map varies depending on a use condition of the air compressor 200, for example, the temperature of oxidant gas sucked into the air compressor 200, or an atmospheric pressure value. For this reason, the controller 90 may store a compressor map for each condition (for example, temperature measured by the temperature sensor 304), and may select, for each condition, an operating point for achieving a requested electric power generation amount. The use condition of the air compressor 200 is acquired with use of the measurement results of various sensors, for example, the first pressure sensor 301, and the temperature sensor 304.

The fuel cell system 100 regulates the speed of the air compressor 200, and the opening degree of at least one of the pressure-regulating valves 551 to 553 included in the pressure-regulating valve unit 55 in response to the electric power generation amount requested to the fuel cell stack 20. The requested electric power generation amount increases or decreases in response to an acceleration request from a fuel cell vehicle incorporating the fuel cell system 100, for example. Specifically, when an accelerator depression amount of the fuel cell vehicle is increased, an acceleration request is made, resulting in an increase in the requested electric power generation amount. When the accelerator depression amount reduces, the acceleration request stops, resulting in a reduction in the requested electric power generation amount. The flow rate L of oxidant gas changes in response to a change in the opening degree of at least one of the pressure-regulating valves 551 to 553 included in the pressure-regulating valve unit 55 and a change in the speed of the air compressor 200. Specifically, when the speed of the air compressor 200 increases, the flow rate L increases. When the speed of the air compressor 200 reduces, the flow rate L reduces. When the outlet-side pressure is decreased, with a change in the passage resistance in accordance with the opening degree of the pressure-regulating valve unit 55, the flow rate L increases. When the outlet-side pressure is increased, the flow rate L reduces. The pressure ratio P changes in response to a change in the speed of the air compressor 200 and a change in the opening degree of the pressure-regulating valve unit 55. The pressure ratio P increases, when the speed of the air compressor 200 increases. When the speed of the air compressor 200 reduces, the pressure ratio P decreases. The pressure ratio P also changes depending on a combination of the opening degrees of the first to third pressure-regulating valves 551 to 553. For example, in the case where the opening degrees of the second pressure-regulating valve 552 and the third pressure-regulating valve 553 are maintained constant, the pressure ratio P reduces when the opening degree of the first pressure-regulating valve 551 increases, because the outlet-side pressure decreases with the increase in the opening degree of the first pressure-regulating valve 551, whereas the pressure ratio P increases when the opening degree of the first pressure-regulating valve 551 decreases, because the outlet-side pressure increases with the decrease in the opening degree of the first pressure-regulating valve 551.

Figure 4:
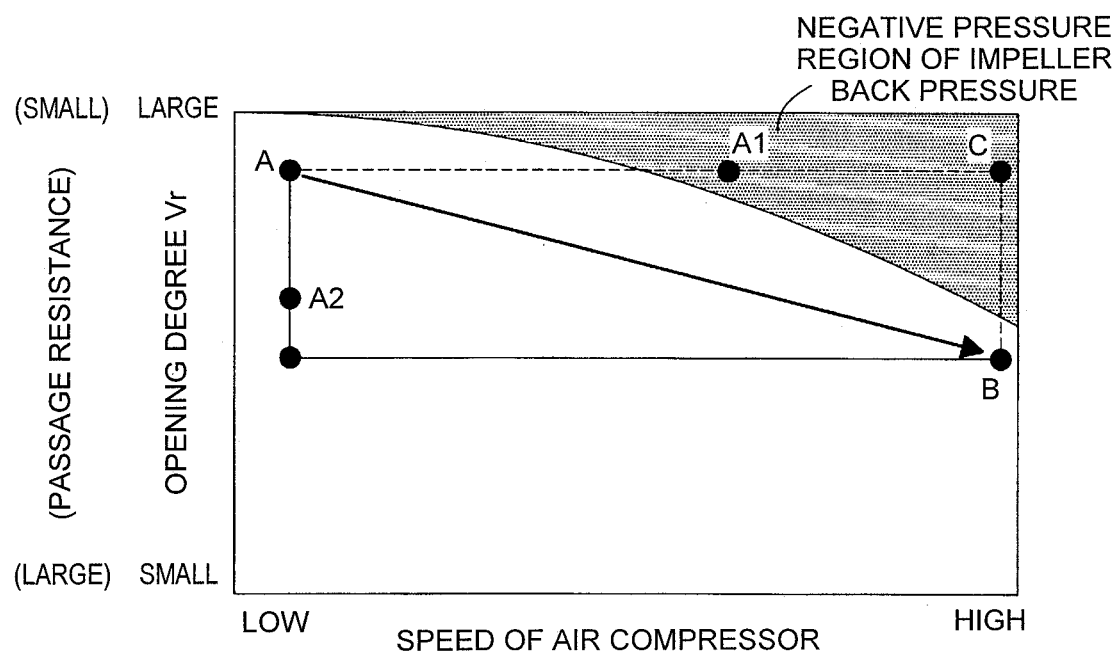
FIG. 4 is a drawing showing a relationship between an operating point and negative region.

FIG. 4 is a drawing showing a relationship between an operating point and a negative region. The drawing shown in FIG. 4 is prepared based on the compressor map shown in FIG. 3. In FIGS. 3 and 4, like operating points are designated by like reference signs. In FIG. 4, the size relationship of an opening degree Vr of the pressure-regulating valve unit 55 is defined in accordance with a passage resistance on the downstream side of the air compressor 200 in the oxidant gas supply and discharge passage 51, that is, a space between the air compressor 200 and the pressure-regulating valve unit 55 to be specific. When the passage resistance is large, the opening degree Vr is small, and when the passage resistance is small, the opening degree Vr is large. Specifically, the opening degree Vr is a value relatively determined by using the passage resistance, obtained when the opening degree of all the pressure-regulating valves 551 to 553 is 100%, as a reference (minimum value).

As shown in FIG. 4, when only the speed of the air compressor 200 is made to increase from the condition in an operating point A, while the opening degrees of the pressure-regulating valves 551 to 553 are maintained constant, the operating point is changed to an operating point A1. In this case, the outlet-side pressure increases, and so the pressure ratio P increases (FIG. 3). When only the opening degree Vr of the pressure-regulating valve unit 55 is made to decrease from the condition in the operating point A, while the speed of the air compressor 200 is maintained constant, the operating point is changed to an operating point A2. In the present embodiment, the opening degree of each of the pressure-regulating valves 551 to 553 is defined by the opening degree map for each combination of a speed of the air compressor 200 and a target outlet-side pressure. That is, when the opening degree Vr of the pressure-regulating valve unit 55 is constant, the opening degree of each of the pressure-regulating valves 551 to 553 is maintained constant, without being changed.

The speed of the air compressor 200 and the opening degree Vr of the pressure-regulating valve unit 55 are controlled to form a combination that prevents the impeller back face pressure from becoming negative. That is, in the case of changing an operating point in the event that the requested electric power generation amount is changed, the controller 90 changes the operating point such that a route of the operation point does not go through the operating points that are in the negative pressure region.

Specifically, when a first operation and a second operation described later are executed, the controller 90 changes an operating point so as not to go through an operating point (for example, an operating point C) that is in the negative pressure region, by executing changing the opening degree Vr of the pressure-regulating valve unit 55 and changing the speed of the air compressor 200 in a specified order. The first operation is an operation that executes both increasing the passage resistance by decreasing the opening degree Vr of the pressure-regulating valve unit 55 and increasing the flow rate L by increasing the speed of the air compressor 200, that is, changing from the operating point A to the operating point B, for example. The second operation is an operation that executes both decreasing the passage resistance by increasing the opening degree Vr of the pressure-regulating valve unit 55 and reducing the flow rate L by decreasing the speed of the air compressor 200, that is, changing from the operating point B to the operating point A, for example.

Changing from the operating point A to the operating point B is executed when the fuel cell vehicle is changed, for example, from a traveling state at constant speed to an acceleration state. Meanwhile, changing from the operating point B to the operating point A is executed when the fuel cell vehicle is changed, for example, from the acceleration state to a constant-speed state or a deceleration state. Here, when the passage resistance is large, there is a possibility that fuel efficiency may deteriorate due to an increased pressure loss of the oxidant gas in the oxidant gas supply and discharge passage 51. Therefore, in order to suppress deterioration in the fuel efficiency, it is preferable to control the opening degree Vr in a wide range so as to decrease the passage resistance. When the speed of the air compressor 200 is high, a maximum opening degree Vr, among the opening degrees Vr that are not negative, becomes smaller than the maximum opening degree Vr when the speed of the air compressor 200 is low. In the case of selecting an opening degree Vr with high fuel efficiency in accordance with the speed of the air compressor 200, it is preferable to change the opening degree Vr in response to a change in the speed of the air compressor 200. Specifically, the controller 90 decreases the opening degree Vr when increasing the speed of the air compressor 200, and increases the opening degree Vr when decreasing the speed of the air compressor 200.

Figure 5:
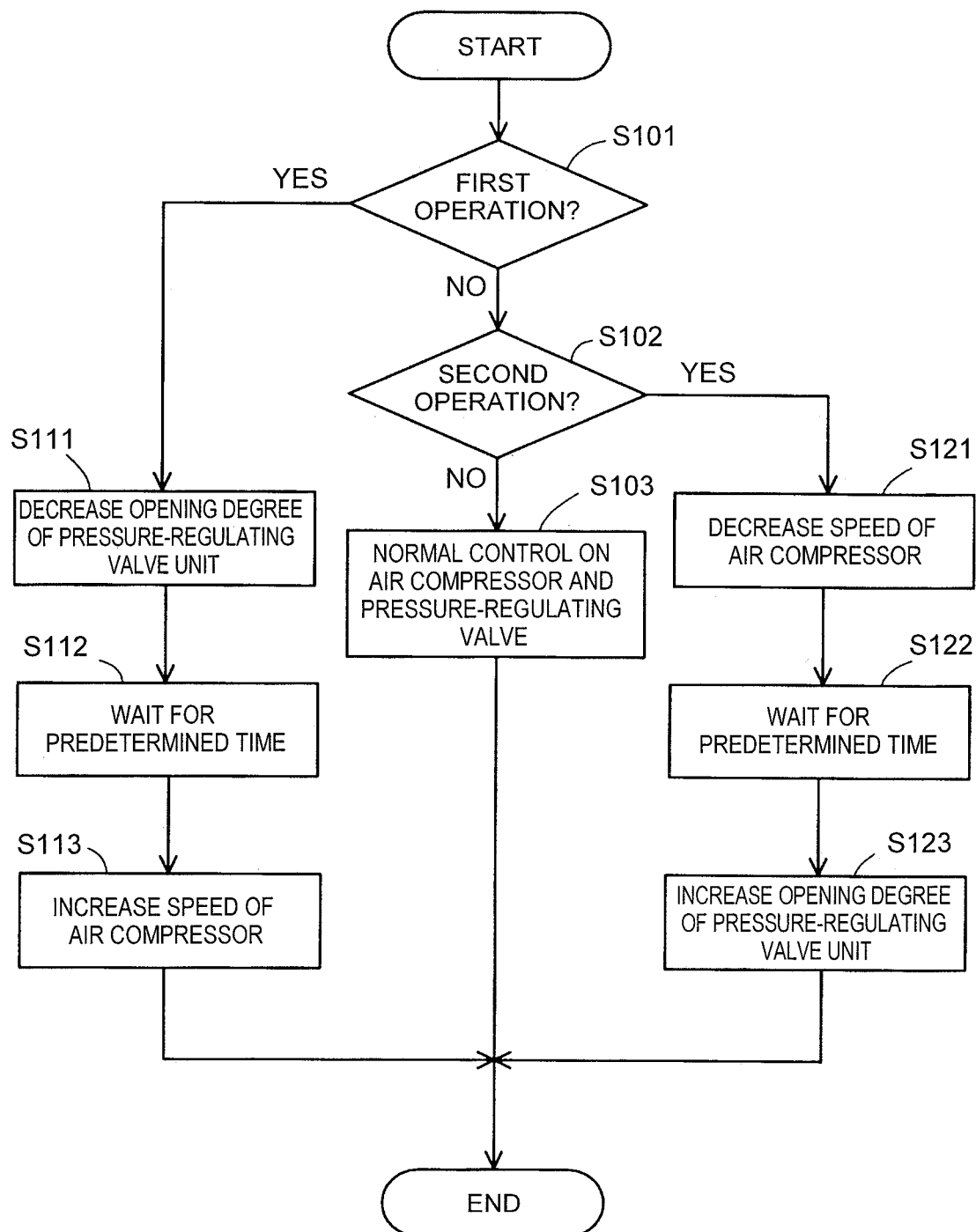
FIG. 5 is a flowchart of an operating point changing process executed by a controller of the fuel cell system according to the first embodiment.

FIG. 5 is a flowchart of an operating point changing process executed by the controller 90 of the fuel cell system 100 according to the first embodiment. Hereinafter, description is given of a control method of the air compressor 200 and the pressure-regulating valve unit 55 executed by the controller 90 at the time of changing an operating point. The operating point changing process is executed when the requested electric power generation amount is changed, so that changing of the operating point is needed. When the operating point changing process is started, the controller 90 determines whether or not changing the operating point is a first operation (step S101). When changing the operating point is the first operation (step S101: Yes), the controller 90 executes a first process (steps S111 to S113). Specifically, the controller 90 first instructs to decrease the opening degree Vr so as to obtain an outlet-side pressure (pressure ratio P) corresponding to a changed operating point to the pressure-regulating valve unit 55 (step S111). After instructing to decrease the opening degree Vr to the pressure-regulating valve unit 55, the controller 90 waits until a predetermined time elapses (step S112). Here, the predetermined time is set to, for example, a period of time taken until decreasing the opening degree Vr is completed in the pressure-regulating valve unit 55 after the controller 90 instructs to decrease the opening degree Vr. When the predetermined time elapses, the controller 90 instructs to increase the speed of the air compressor 200 to achieve a delivery flow rate corresponding to the changed operating point (step S113). Thus, the operating point changing process in the case where the first operation is executed is completed.

When changing the operating point is not the first operation (step S101: No), the controller 90 determines whether or not the changing the operating point is the second operation (step S102). When the changing the operation point is the second operation (step S102: Yes), the controller 90 executes the second process. Specifically, the controller 90 first instructs to decrease the speed of the air compressor 200 to achieve a delivery flow rate corresponding to the changed operating point (step S121). After instructing to decrease the speed to the air compressor 200, the controller 90 waits until a predetermined time elapses (step S122). Here, the predetermined time is set to, for example, a period of time taken until decreasing the speed of the air compressor 200 is completed after the controller 90 instructs to decrease the speed. When the predetermined time elapses, the controller 90 instructs to increase the opening degree Vr to achieve an outlet-side pressure corresponding to the changed operating point to the pressure-regulating valve unit 55 (step S123). Thus, the operating point changing process in the case where the second operation is executed is completed.

When changing the operating point is not the first and second operations (step S101: No, S102: No), the controller 90 executes normal control (step S103). The normal control refers to executing control on the air compressor 200 and the pressure-regulating valve unit 55 in a given order, without providing a waiting time between instructing to the air compressor 200 and instructing to the pressure-regulating valve unit 55. Thus, the operating point changing process in the case where the first and second operations are not executed is completed.

In the fuel cell system 100 according to the present embodiment, the flow rate L and the pressure ratio P of oxidant gas and the speed of the air compressor 200 are used to monitor whether or not the operating point changing process is normally executed. The flow rate L is monitored by using a suction flow rate that is a flow rate on the upstream side of the air compressor 200 measured by the air flowmeter 303. The suction flow rate is correlated with the delivery flow rate L. Monitoring of the pressure ratio P is performed by calculating the pressure ratio P with use of the first pressure sensor 301 and the second pressure sensor 302. Specifically, the pressure ratio P is a value obtained by dividing the outlet-side pressure of the air compressor 200 measured by the second pressure sensor 302 by the atmospheric pressure measured by the first pressure sensor 301. Used as the speed of the air compressor 200 is a speed instructed by the controller 90 at the time of changing the speed of the air compressor 200.

In the present embodiment, when the first operation is executed, the controller 90 waits for a predetermined time, after instructing to decrease the opening degree Vr (step S112). When the second operation is executed, the controller 90 waits for a predetermined time, after instructing to decrease the speed to the air compressor 200 (step S122). However, the process executed by the controller 90 is not limited to this. For example, the controller 90 may determine the progress of changing the speed of the air compressor 200 or changing the opening degree Vr of the pressure-regulating valve unit 55 with use of the measurement results of the air flowmeter 303 and the pressure sensors 301, 302, and the compressor map. Then, the controller 90 may execute the subsequent process (steps S113, S123) based on the determination. The predetermined time may be determined in accordance with the level of a change between the operating point before change and the operating point after change. For example, in first operation, when a change level of the opening degree Vr of the pressure-regulating valve unit 55 is large, the predetermined time may be set longer than when the change level is small. In the second operation, when a change level of the speed of the air compressor 200 is large, the predetermined time may be set longer than when the change level is small.

In the present embodiment, determining whether the first operation or the second operation is executed (steps S101, S102) is executed with a preinstalled change pattern of the operating point used as the first operation or the second operation. The method for determining whether the first operation or the second operation is executed is not limited to this. For example, the controller 90 may execute determination by comparing the operating point before change with the operating point after change for every operation.

According to the first embodiment described in the foregoing, in the first operation where both increasing the passage resistance by decreasing the opening degree Vr of the pressure-regulating valve unit 55 and increasing the flow rate L by increasing the speed of the air compressor 200 are performed, the controller 90 executes the first process for increasing the speed of the air compressor 200 after decreasing the opening degree Vr of the pressure-regulating valve unit 55. In the second operation where both decreasing the passage resistance by increasing the opening degree Vr of the pressure-regulating valve unit 55 and reducing the flow rate by decreasing the speed of the air compressor 200 are performed, the controller 90 executes the second process for increasing the opening degree Vr of the pressure-regulating valve unit 55 after decreasing of the speed of the air compressor 200. This makes it possible to reduce a possibility that the impeller back face pressure becomes negative, and to thereby suppress a leakage of the oil in the housing 170 to the impeller housing portion 122 that is outside the housing 170. Therefore, the oil flowing into the fuel cell stack 20 can be suppressed.

According to the first embodiment, when the first operation is performed, regardless of whether or not a route of the operating point may possibly go through the negative pressure region, the controller 90 executes the first process for increasing the speed of the air compressor 200 after, decreasing the opening degree Vr of the pressure-regulating valve unit 55 (step S101 of FIG. 5: Yes, S111 to S113). When the second operation is performed, regardless of whether or not a route of the operating point may possibly go through the negative pressure region, the controller 90 increases the opening degree Vr of the pressure-regulating valve unit 55 after decreasing the speed of the air compressor 200 (step S102 of FIG. 5: Yes, S121 to S123). Hence, it is possible to reduce the time taken for determining whether or not the impeller back face pressure becomes negative. It is also possible to suppress complicated control as compared with the case of determining whether or not the impeller back face pressure becomes negative when the first process or the second process is executed. Therefore, the fuel cell system 100 can swiftly execute the operating point changing process as compared with the case of determining whether or not the impeller back face pressure becomes negative when the first process or the second process is executed.

B. Second Embodiment

Figure 6:
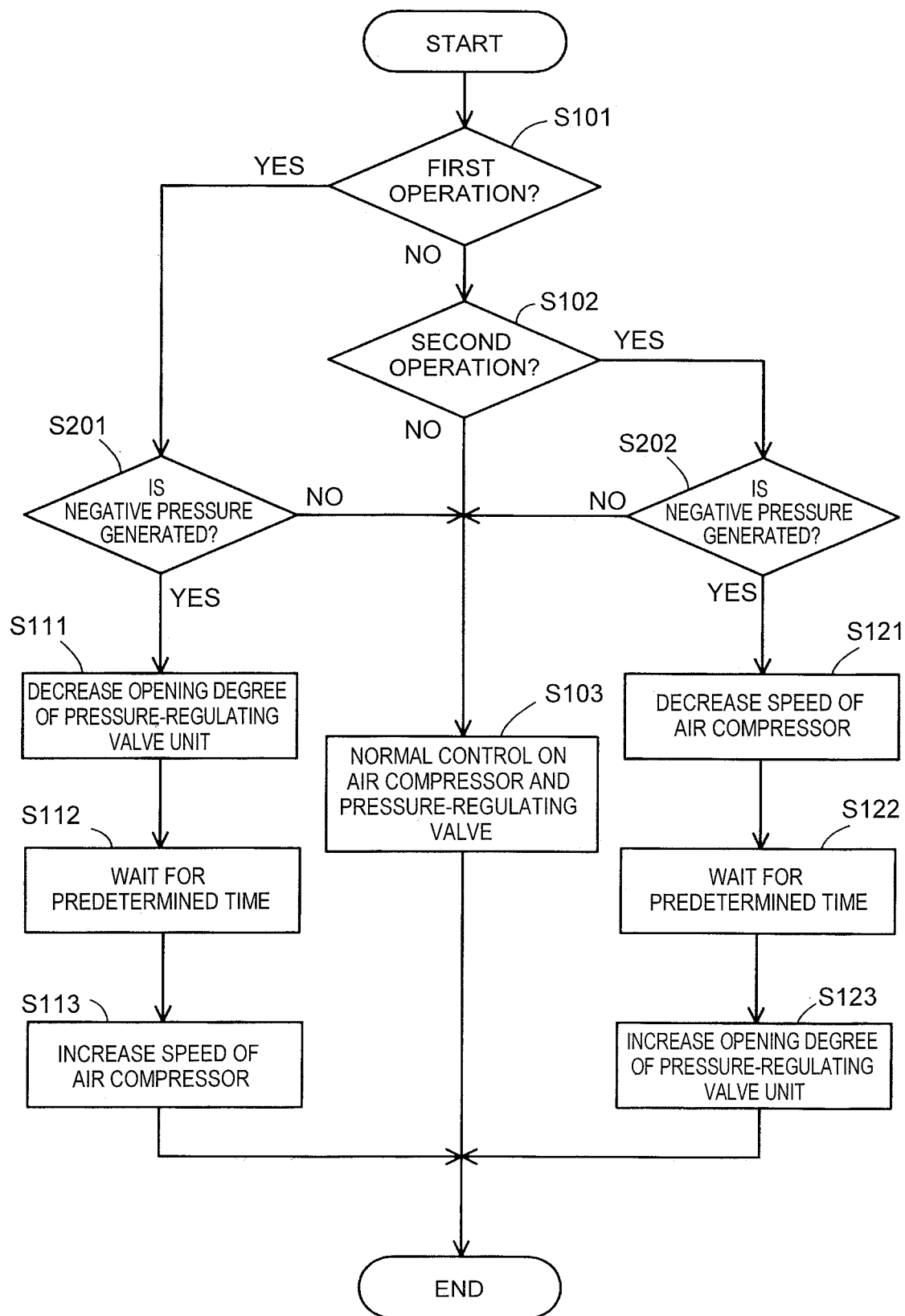
FIG. 6 is a flowchart of an operating point changing process executed by the controller of the fuel cell system according to a second embodiment.
Figure 7:
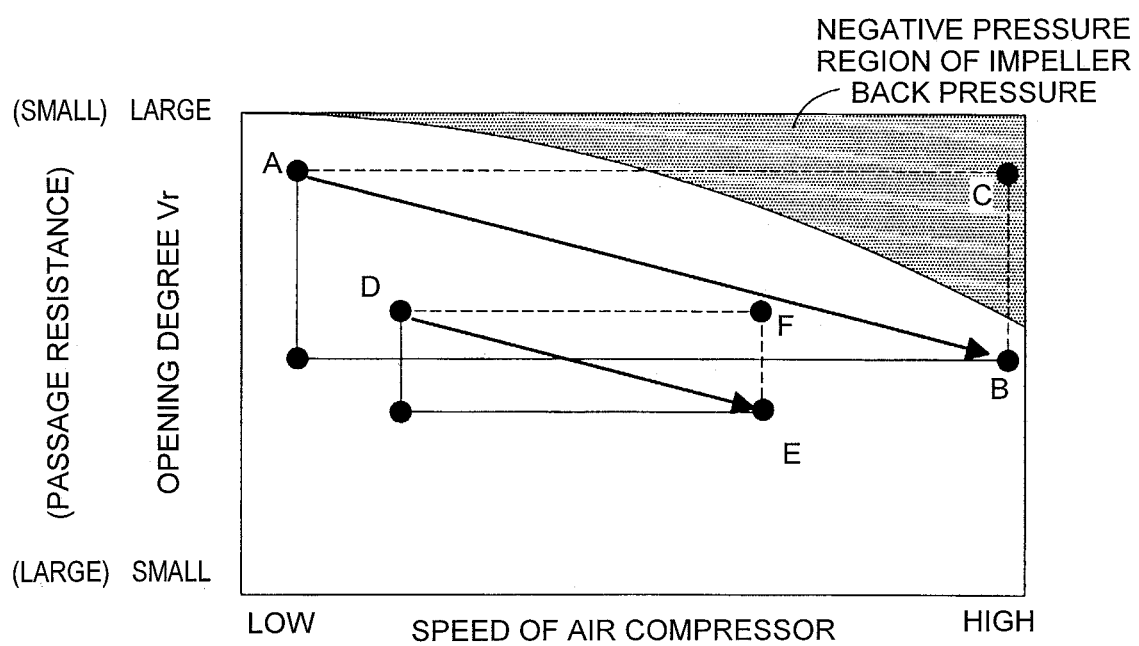
FIG. 7 is a second drawing showing the relationship between the operating point and the negative pressure region.

FIG. 6 is a flowchart of an operating point changing process executed by the controller 90 of the fuel cell system 100 according to a second embodiment. FIG. 7 is a second drawing showing the relationship between the operating point and the negative pressure region. In FIG. 6, when the process similar to the process shown in FIG. 5 is executed, the process is designated by the similar reference sign.

The fuel cell system 100 according to the second embodiment is different from the fuel cell system 100 according to the first embodiment in the contents of the operating point changing process executed by the controller 90. In the first embodiment, when the first operation is executed, the first process (steps S111 to S113 of FIG. 5) is executed regardless of whether or not the impeller back face pressure may become negative. When the second operation is executed, the second process (steps S121 to S123 of FIG. 5) is executed regardless of whether or not the impeller back face pressure may become negative. In contrast, in the second embodiment, when the first operation and the second operation are executed, it is determined, in the case of changing an operating point, whether or not there is an operating point that makes the impeller back face pressure negative in the middle of a route for changing the operating point (step S201, step S202). This determination is executed with a preinstalled pattern of the first operation or the second operation that makes the impeller back face pressure negative. For example, as shown in FIG. 7, in the case of increasing the speed before decreasing the opening degree Vr in the first operation for changing the operating point from an operating point A to an operating point B, a route for changing the operating point goes through an operating point C that makes the impeller back face pressure negative. Meanwhile, in the case of increasing the speed before decreasing the opening degree Vr in the first operation for changing the operating point from an operating point D to an operating point E, the route goes through an operating point F that does not make the impeller back face pressure negative. In the case of increasing of the opening degree Vr before decreasing the speed in the second operation for changing the operating point from the operating point B to the operating point A, the route goes through the operating point C that makes the impeller back face pressure negative. Meanwhile, in the case of increasing the opening degree Vr before decreasing the speed in the second operation for changing the operating point from the operating point E to the operating point D, the route goes through an operating point F that does not make the impeller back face pressure negative. Thus, even when the first operation and the second operation are performed, there are cases where, depending on the operating points before and after the change, the impeller back face pressure does not become negative no matter which operating point the route goes through. That is, when the operating point is changed from the operating point D to the operating point E in step S201 of FIG. 6, the controller 90 determines "No", and when the operating point is changed from the operating point A to the operating point B, the controller 90 determines "Yes." When the operating point is changed from the operating point E to the operating point D in step S202 of FIG. 6, the controller 90 determines "No", and when the operating point is changed from the operating point B to the operating point A, the controller determines "Yes."

As shown in FIG. 6, when the first operation is performed, and the operation point is changed, the controller 90 determines whether or not there is a possibility that the route goes through an operating point that makes the impeller back face pressure negative (step S201). When there is a possibility that the route goes through an operating point that makes the impeller back face pressure negative (step S201: Yes), the controller 90 executes step S111. Meanwhile, when the operating point is changed, and there is no possibility that the route goes through an operating point that makes the impeller back face pressure negative (step S201: No), normal control is executed (step S103). When the second operation is performed, and the operation point is changed, the controller 90 determines whether or not there is a possibility that the route goes through an operating point that makes the impeller back face pressure negative (step S202). When there is a possibility that the route goes through an operating point that makes the impeller back face pressure negative (step S202: Yes), the controller 90 executes step S121. Meanwhile, when the operating point is changed, and there is no possibility that the route goes through an operating point that makes the impeller back face pressure negative (step S202: No), normal control is executed (step S103).

According to the second embodiment described in the foregoing, as in the first embodiment, it is possible to reduce the possibility that the impeller back face pressure becomes negative, and to thereby suppress a leakage of the oil in the housing 170 to the impeller housing portion 122 that is outside the housing 170. Therefore, the oil flowing into the fuel cell stack 20 can be suppressed.

According to the second embodiment, in the first operation, the controller 90 executes the first process, when the impeller back face pressure becomes negative in the case where the speed of the air compressor 200 is increased first, with use of the data (negative pressure operating point data) indicative of a pattern of the operating point that makes the impeller back face pressure, calculated in advance, negative. In the second operation, the controller 90 executes the second process, when the impeller back face pressure becomes negative in the case where the opening degree Vr is increased first, with use of the negative pressure operating point data. That is, in the first operation and the second operation, normal control is executed when there is no possibility that the impeller back face pressure becomes negative (step S103 of FIG. 6). Hence, when there is no possibility of the occurrence of negative pressure, the degree of freedom of control on the pressure-regulating valve unit 55 and the air compressor 200 can be enhanced. Therefore, when the first or second operation is executed and there is no possibility that the impeller back face pressure becomes negative, a normal process that is simpler than the first or second process is executable.

C. Other Embodiments

C-1. Third Embodiment

In the above embodiments, although the controller 90 executes both the first process and the second process, the present disclosure is not limited to this configuration. The controller 90 may execute only one of the first process and the second process. For example, the controller 90 may execute the first process when performing the first operation, and execute normal control when performing the second operation. This makes it possible to suppress the impeller back face pressure becoming negative when the first operation is performed. For example, the controller 90 may execute the second process, when performing the second operation, and execute normal control when performing the first operation. This makes it possible to suppress the impeller back face pressure becoming negative when the second operation is performed. In both the configurations, it is possible to suppress the impeller back pressure becoming negative in one of the cases where the first operation is performed and where the second operation is performed. As a result, it is possible to reduce a possibility that the impeller back face pressure becomes negative, and to thereby suppress a leakage of the oil in the housing 170 to the impeller housing portion 122 that is outside the housing 170. Therefore, the oil flowing into the fuel cell stack 20 can be suppressed.

C-2. Fourth Embodiment

Other configurations may be adopted for the air compressor 200 in the above embodiments. The air compressor 200 may have the impeller that delivers oxidant gas, the housing 170 that divides a motor housing portion 173 that is an area where the motor 130 is disposed, from the impeller housing portion 122, and the shaft 131 extending through the housing 170. The air compressor 200 may be an axial air compressor, for example.

C-3. Fifth Embodiment

In the above embodiments, other seal mechanisms may be adopted in place of the mechanical seal 150. For example, the mechanical seal 150 may further include a secondary seal between the fixed ring and the housing 170 or between the shaft 131 and the rotation ring. A resin seal may be adopted in place of the mechanical seal 150. The mechanical seal 150 may also be omitted.

C-4. Sixth Embodiment

In the above embodiments, other passage structures may be adopted as the oxidant gas supply and discharge passage 51. For example, the oxidant gas supply and discharge passage 51 may not include the bypass passage 54.

C-5. Seventh Embodiment

In the above embodiments, other valve systems may be adopted as the pressure-regulating valves 551 to 553. The first pressure-regulating valve 551, the second pressure-regulating valve 552, or the third pressure-regulating valve 553 may be an open-close valve without the function of changing the passage resistance in stages. The first pressure-regulating valve 551 and the second pressure-regulating valve 552 are may be open-close valves without the function of changing the passage resistance in stages. The second pressure-regulating valve 552 and the third pressure-regulating valve 553 are may be open-close valves without the function of changing the passage resistance in stages. Moreover, one of the first pressure-regulating valve 551 and the third pressure-regulating valve 553 may be omitted.

In the fourth to seventh embodiments, it is possible to reduce the possibility that the impeller back face pressure becomes negative, and to thereby suppress a leakage of the oil in the housing 170 to the impeller housing portion 122 that is outside the housing 170, as in the first embodiment or the second embodiment. Therefore, the oil flowing into the fuel cell stack 20 can be suppressed.

Without being limited to the aforementioned embodiments, the present disclosure can be implemented in various configurations without departing from the meaning thereof. For example, technical features in the embodiments corresponding to the technical features in each aspect disclosed in SUMMARY can properly be replaced or combined in order to solve some or all of the aforementioned problems, or in order to accomplish some or all of the aforementioned effects. The technical features may properly be deleted unless otherwise specified as essential elements in this specification.

What is claimed is:

1. A fuel cell system, comprising:
a fuel cell stack;
a fuel gas supply mechanism configured to supply fuel gas to the fuel cell stack;
an oxidant gas supply and discharge mechanism including an air compressor configured to supply oxidant gas to the fuel cell stack; and
a controller configured to control supply of the fuel gas and the oxidant gas to control electric power generation by the fuel cell stack, wherein:
the oxidant gas supply and discharge mechanism has an oxidant gas supply and discharge passage configured to pass the oxidant gas, and a pressure-regulating valve disposed on a downstream side of the air compressor in the oxidant gas supply and discharge passage;
the air compressor has an impeller disposed in the oxidant gas supply and discharge passage to deliver the oxidant gas, a motor configured to rotate the impeller, a housing that houses the motor and divides an area where the motor is disposed from the oxidant gas supply and discharge passage where the impeller is disposed, and a shaft that extends through the housing to couple a rotary shaft of the motor with a rotary shaft of the impeller; and
the controller is programmed to execute a first process, the first process including increasing a speed of the impeller after decreasing an opening degree of the pressure-regulating valve, the first process being executed in a first operation where both decreasing the opening degree of the pressure-regulating valve and increasing the speed of the impeller are performed.

2. The fuel cell system according to claim 1, wherein the controller is programmed to:
execute the first process without determining whether or not an impeller back pressure, that is a pressure inside a space between the impeller and the housing in the oxidant gas supply and discharge passage, is negative in the first operation.

3. The fuel cell system according to claim 1, wherein the controller is programmed to:
determine whether or not an impeller back pressure, that is a pressure inside a space between the impeller and the housing in the oxidant gas supply and discharge passage, becomes negative with use of data obtained in advance, the data indicating an operating point that represents a combination of the opening degree of the pressure-regulating valve and the speed of the impeller that makes the impeller back pressure negative, and
execute the first process, when the impeller back pressure becomes negative in a case where at least increasing the speed is executed first in the first operation.

4. A control method of a fuel cell system, the fuel cell system including a fuel cell stack, a fuel gas supply mechanism configured to supply fuel gas to the fuel cell stack, an oxidant gas supply and discharge mechanism including an air compressor configured to supply oxidant gas to the fuel cell stack, and a controller configured to control supply of the fuel gas and the oxidant gas to control electric power generation by the fuel cell stack, the oxidant gas supply and discharge mechanism having an oxidant gas supply and discharge passage configured to pass the oxidant gas, and a pressure-regulating valve disposed on a downstream side of the air compressor in the oxidant gas supply and discharge passage, the air compressor having an impeller disposed in the oxidant gas supply and discharge passage to deliver the oxidant gas, a motor configured to rotate the impeller, a housing that houses the motor and divides an area where the motor is disposed from the oxidant gas supply and discharge passage where the impeller is disposed, and a shaft that extends through the housing to couple a rotary shaft of the motor with a rotary shaft of the impeller, the control method comprising:
executing a first process by the controller, the first process including increasing a speed of the impeller after decreasing an opening degree of the pressure-regulating valve, the first process being executed in a first operation where both decreasing the opening degree of the pressure-regulating valve and increasing the speed of the impeller are performed.

5. The fuel cell system according to claim 1, wherein the controller is programmed to:
execute a second process, the second process including increasing the opening degree of the pressure-regulating valve after decreasing the speed of the impeller, the second process being executed in a second operation where both increasing the opening degree of the pressure-regulating valve and decreasing the speed of the impeller are performed.

6. The fuel cell system according to claim 5, wherein the controller is programmed to:
execute the second process without determining whether or not an impeller back pressure, that is a pressure inside a space between the impeller and the housing in the oxidant gas supply and discharge passage, is negative in the second operation.

7. The fuel cell system according to claim 5, wherein the controller is programmed to:
determine whether or not an impeller back pressure, that is a pressure inside a space between the impeller and the housing in the oxidant gas supply and discharge passage, becomes negative with use of data obtained in advance, the data indicating an operating point that represents a combination of the opening degree of the pressure-regulating valve and the speed of the impeller that makes the impeller back pressure negative, and
execute the second process, when the impeller back pressure becomes negative in a case where at least increasing the opening degree is executed first in the second operation.

8. The control method according to claim 4, further comprising:
executing a second process by the controller, the second process including increasing the opening degree of the pressure-regulating valve after decreasing the speed of the impeller, the second process being executed in a second operation where both increasing the opening degree of the pressure-regulating valve and decreasing the speed of the impeller are performed.

* * * * *